United States Patent [19]

Schwartz et al.

[11] 4,051,727
[45] Oct. 4, 1977

[54] LIQUID MIXTURE INDICATOR FOR RUG SHAMPOO APPARATUS

[75] Inventors: Osten Schwartz, Varmdo; Milos Vukotic, Bandhagen, both of Sweden

[73] Assignee: Aktiebolaget Electrolux, Stockholm, Sweden

[21] Appl. No.: 691,521

[22] Filed: June 1, 1976

[30] Foreign Application Priority Data

June 11, 1975 Sweden .............................. 7506680

[51] Int. Cl.[2] ............................................. G01F 23/08
[52] U.S. Cl. ...................................... 73/306; 73/315; 141/95; 222/157
[58] Field of Search ................ 73/306, 307, 454, 315; 141/94, 95; 222/51, 157; 116/118 R

[56] References Cited

U.S. PATENT DOCUMENTS

| 1,394,611 | 10/1921 | Delich | 141/94 X |
| 2,296,169 | 9/1942 | Linebarger | 73/454 |
| 2,859,724 | 11/1958 | Cronin et al. | 73/317 |
| 3,340,736 | 9/1967 | Suematsu | 73/454 |
| 3,359,800 | 12/1967 | Heil | 73/317 |
| Re. 14,314 | 6/1917 | Flegel | 73/315 X |

*Primary Examiner*—Daniel M. Yasich
*Attorney, Agent, or Firm*—Alfred E. Miller

[57] ABSTRACT

An indicator mounted on a receptacle for determining the proportion of the liquid mixture components in the receptacle of a liquid dispensing apparatus, such as a rug or carpet shampoo device. Even if the receptacle is partly filled with a liquid mixture, the present indicator shows the correct amount to be added to each of the components to thereby fill the receptacle to a given level.

7 Claims, 3 Drawing Figures

LIQUID MIXTURE INDICATOR FOR RUG SHAMPOO APPARATUS

BACKGROUND OF THE INVENTION

Rug and carpet shampooing devices are known in which several components are mixed such as water and a detergent. Air is blown into the liquid receptacle in order to produce a foam which is propelled by the air flow to the surface to be cleaned, i.e. a rug or a carpet. In this particular construction and arrangement, it has been known to be difficult to proportion precisely the various components of the liquid mixture, especially when the receptacle is partially filled, and when a component or components are to be added. In order to solve this problem, special measuring vessels were utilized, however, this method is troublesome and time consuming.

In order to overcome the aforesaid disadvantage of prior art constructions, the present invention relates to an arrangement and construction which continually indicates and shows how much of each component should be added to the liquid receiving receptacle in order to maintain the correct mixture proportion.

It is a further object of the present invention to provide a float device on the liquid surface of the receptacle that is connected to an indicator means which at any given time indicates the quantity of each component to be added for obtaining the correct proportion of the components of the liquid mixture.

It is another object of the present device to provide an indicator for the liquid receptacle, or a part connected thereto, which before filling of the liquid receptacle is acted upon by an operating member and is blocked in a predetermined position. Subsequently, after filling to a given predetermined level in the liquid receptacle, the operating member is released.

It is a further object of the present invention to provide a liquid receptacle indicating device which is relatively simple in construction and is reliable for the purposes intended and continually displays the amount of mixture components in the liquid receptacle.

In order that the invention will be more clearly understood, it will now be disclosed in greater detail with reference to the accompanying drawings, in which.

DESCRIPTION OF THE PREFERRED EMBODIMENT

Figure 1:
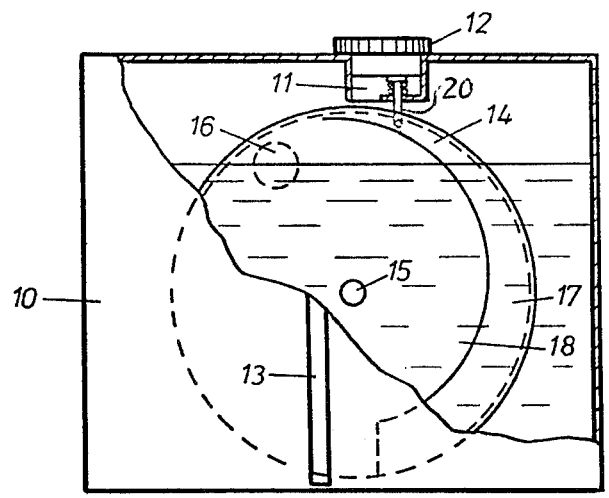
FIG. 1 is an elevational view of the liquid receptacle, which is partly broken away for purposes of clarity, and shows the liquid level in its upper position.
Figure 2:
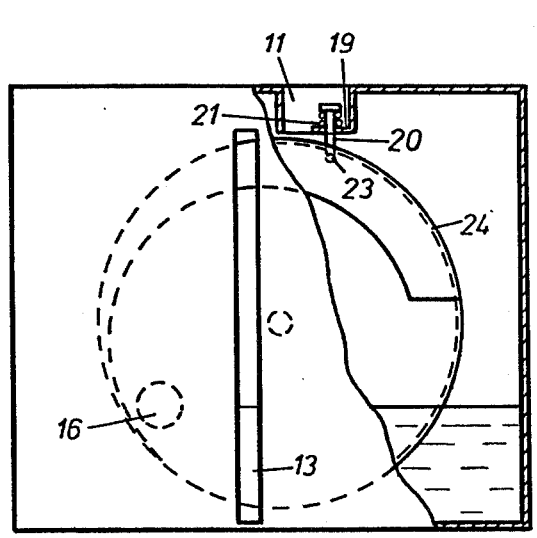
FIG. 2 is an elevational view similar to FIG. 1 in which the liquid receptacle is shown partly broken away and in which the liquid level has been lowered to a point in which components are required to be added.

As seen in the figures, a receptacle 10 of the type utilized with a rug or carpet shampoo apparatus (not shown) is seen provided with a fill opening 11 of a tubular configuration. The opening 11 has a portion that is threaded which receives a screw-connected cover 12. As seen in FIGS. 1 and 2, a narrow, vertically-disposed sight glass 13 is mounted on the receptacle 10. Approximately at the same level as the middle of the sight glass, a circular disc 14 is rotatably mounted on the receptacle 10 by means of a horizontally disposed shaft 15. A float device 16 is secured to the disc 14 and adjacent to the periphery thereof. The float is adapted to rest on the surface of the liquid mixture present in the receptacle 10. In the usual manner, the float follows the rise and fall of the liquid present in the receptacle, and consequently the disc rotates correspondingly.

It will be observed that the disc 14 is provided with two fields 17 of different colors. The field 17 is a scimitarlike curved part located adjacent to the periphery of the disc, while the remainder area of disc forms the field 18. As seen particularly in FIG. 2, both the fields 17 and 18 are visible through the narrow, vertically-disposed sight glass 13. In the latter, the above-described fields appear as narrow upper and lower bands of color.

Figure 3:
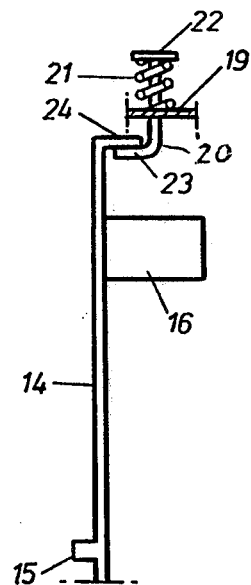
FIG. 3 is a side elevational view, on a larger scale, of the blocking mechanism arrangement utilized in the present invention.

It will be noted that the upper part of the disc 14 is positioned adjacent to the fill opening 11 which is provided with a ledge 19 in the bottom portion thereof. An L-shaped pin 20 extends through an opening in the ledge 19 and is normally urged in an upward position by means of a coil spring 21 captured between the under-surface of a head 22 and a portion of the top surface of the ledge 19. The bottom leg 23 of the L-shaped pin 20 is shown in FIG. 3 as extending substantially at right angles to the body of the pin 20. In the normal condition, the pin 20 is urged downwardly against the pressure of the spring 21 by means of the cover 12, however when the cover is removed, the pin 20 rises and the portion 23 abuts a rearwardly projecting peripheral edge 24 of the disc 14, and thereby maintains the disc in a given position.

The present liquid mixture indicator for a rug shampoo apparatus operates as follows: When two liquid components are to be supplied to the receptacle 10 the cover 12 is removed and the pin 20 is thereby urged upwardly by the spring 21. This action causes the disc to be locked against rotation about the shaft 15. Thereafter, one liquid component is added up to the parting line between the differently colored fields 17 and 18 of the disc 14, while the other component is filled up to the periphery of the disc 14. When this is accomplished, the receptacle 10 has the correct mixture charge. Overcharging is prevented because the fill opening 11 is tubular in configuration and projects downwardly into the receptacle 10. Because of this construction there will always be a space between the liquid level in the container or receptacle 10 and the top of said receptacle.

Thereafter, when the cover 12 is placed on the opening 11 in the receptacle 10, pin 20 is acted upon in such a manner that the disc 14 is released, since the portion 23 of the pin 20 no longer abuts the edge 24 of the disc 14. When this occurs the disc is rotated in a counter-clockwise direction under the influence of the lifting force of the float 16, so that the float will rest on the liquid surface at all times. However, when the mixture in the receptacle is used up, the float continues to sink and the disc to turn successively so that the quantity of makeup components to be charged in the liquid receptacle is continuously indicated in the sight glass 13. Thus, at any given time, one can observe what constitutes the actual mixture in the liquid receptacle, and make additions as required.

It will be observed that only two components are shown as an example for use in the present apparatus. However, it is within the scope of the invention to utilize any desired number of components in a liquid mixture which can be indicated and represented by corresponding colored fields on the rotating disc.

What is claimed:

1. A liquid mixture indicator for a liquid dispensing apparatus in which the correct proportions of the components in a receptacle are continuously determined comprising: a float on the liquid surface in said receptacle, a movable indicator dial rotatably mounted on the receptacle and operatively connected to said float, said indicator dial at any given time showing through a wall of the receptacle the quantity of each component to be added to obtain the correct proportions of said liquid mixture, an operator member engaging said indicator dial before filling of said receptacle to thereby block the movement of said indicator dial whereby accurate proportions of the components to be added may be determined through said wall, and means for releasing said operator member from engagement with said indicator dial after the receptacle has been filled to a given level.

2. An indicator as claimed in claim 1 further comprising a fill opening for said receptacle, a cover which normally covers said fill opening, said operating member being acted upon by said cover whereby the opening of said cover causes said operator member to block said indicator dial and the closing of said cover releases said indicator dial.

3. An indicator as claimed in claim 2 wherein said fill opening projects into the interior of said receptacle and is substantially circular in configuration.

4. An indicator as claimed in claim 2 further comprising spring means for said operator member which normally urges said member into engagement with said indicator dial.

5. An indicator as claimed in claim 1 wherein said indicator dial is a disc, means for rotatably mounting said disc in said receptacle, said disc having several colored fields thereon, one of said fields having a predetermined configuration which at any given time indicates the quantity of said components to be added for achieving said accurate proportions, a sight glass in close proximity to said disc so that said fields are visible in said sight glass, the size of said one of said fields increasing as the float sinks in said receptacle while said disc rotates.

6. An indicator as claimed in claim 5 wherein said sight glass is relatively long and narrow, and is vertically disposed with respect to said receptacle.

7. An indicator as claimed in claim 5 wherein said float is secured to said disc adjacent to the periphery thereof.

* * * * *